US009810760B1

(12) United States Patent
Borchardt et al.

(10) Patent No.: US 9,810,760 B1
(45) Date of Patent: Nov. 7, 2017

(54) COMPUTING ANGLE OF ARRIVAL OF RADIO SIGNALS

(71) Applicant: National Technology & Engineering Solutions of Sandia, LLC, Albuquerque, NM (US)

(72) Inventors: John J. Borchardt, Albuquerque, NM (US); David K. Steele, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 507 days.

(21) Appl. No.: 14/552,707

(22) Filed: Nov. 25, 2014

(51) Int. Cl.
  G01S 5/04 (2006.01)
  G01S 3/14 (2006.01)
(52) U.S. Cl.
  CPC ..................... *G01S 3/14* (2013.01)
(58) Field of Classification Search
  CPC ..................... G01S 5/04; G01S 3/14
  USPC ......................................... 342/444
  See application file for complete search history.

(56) References Cited

U.S. PATENT DOCUMENTS

| | | |
|---|---|---|
| 5,017,929 A | 5/1991 | Tsuda |
| 5,786,791 A | 7/1998 | Bruckert |
| 6,087,974 A * | 7/2000 | Yu .................. F41G 7/2226 244/3.1 |
| 6,255,991 B1 | 7/2001 | Hedin |
| 6,407,711 B1 * | 6/2002 | Bonebright ............ H01Q 1/286 343/705 |
| 8,031,119 B1 | 10/2011 | Francis et al. |
| 8,121,225 B1 | 2/2012 | Francis |
| 8,723,729 B2 | 5/2014 | Desai et al. |
| 2008/0007471 A1 * | 1/2008 | Goldberg ............... H01Q 1/286 343/705 |

OTHER PUBLICATIONS

Holub, et al., "A Novel Microstrip Patch Antenna Miniaturization Technique: A Meanderly Folded Shorted-Patch Antenna," IEEE, 2008, 4 pages.
Li, et al., "Development and Analysis of a Folded Shorted-Patch Antenna with Reduced Size," IEEE Transactions on Antennas and Propagation, vol. 52, Issue 2, Feb. 2004, pp. 555-562.

* cited by examiner

*Primary Examiner* — Harry Liu
(74) *Attorney, Agent, or Firm* — Medley, Behrens & Lewis, LLC (57) ABSTRACT

Various technologies pertaining to computing angle of arrival of radio signals are described. A system that is configured for computing the angle of arrival of a radio signal includes a cylindrical sheath wrapped around a cylindrical object, where the cylindrical sheath acts as a ground plane. The system further includes a plurality of antennas that are positioned about an exterior surface of the cylindrical sheath, and receivers respectively coupled to the antennas. The receivers output measurements pertaining to the radio signal. A processing circuit receives the measurements and computes the angle of arrival of the radio signal based upon the measurements.

20 Claims, 5 Drawing Sheets

COMPUTING ANGLE OF ARRIVAL OF RADIO SIGNALS

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

There are many scenarios in which it is desirable to determine a direction (angle) of arrival of a radio signal at a location where the radio signal is detected. For example, there are surveillance applications where it is desirable to identify an approximate location of a transmitter that is transmitting radio signals over a frequency of interest. In another example, it is often desirable to relatively accurately ascertain, with respect to a particular location, an angle of arrival of television signals, such that an antenna can be properly directed to achieve maximum signal-to-noise ratio (SNR) of a received television signal. Still further, if it is desired to establish a two-way radio link between two base stations, angles of arrival of radio signals between the base stations can be used to direct transmissions between the base stations (e.g., through beamforming techniques).

Conventional techniques for determining angle of arrival are expensive, labor-intensive, and/or aesthetically displeasing. For example, an antenna may be mounted on a rotatable mount, and the mount can be rotated to identify a position where the antenna receives the signal with highest SNR. This technique involves the expense of the rotatable mount, and is also known to be somewhat inaccurate. Another exemplary technique involves mounting an array of ¼ wavelength antennas on a ground plane, where the ground plane is arranged horizontally and the antennas of the array vertically extend from the ground plane. This technique requires free airspace between antennas of the array—thus, the array and ground plane is difficult to conceal, rendering such system aesthetically displeasing.

SUMMARY

The following is a brief summary of subject matter that is described in greater detail herein. This summary is not intended to be limiting as to the scope of the claims.

Described herein are various technologies pertaining to a low visual profile sensor system that is configured to compute angle of arrival of a transmitted radio signal (e.g., where the angle of arrival is with respect to the system). The system comprises an antenna array that includes a plurality of antennas, wherein the antennas are positioned about a cylindrical obstacle. For example, the cylindrical obstacle may be a tree trunk, a tree branch, a pipe, a telephone pole, a light pole, or any other suitable cylindrical obstacle. Thus, it can be ascertained that the cylindrical obstacle may be a right cylinder or an elliptic cylinder. The system also includes at least one receiver that is coupled to the plurality of antennas. The receiver(s) are configured to receive voltages at the terminals of the antennas, and output measurements based upon such voltages.

The system also optionally includes a cylindrical ground plane that is fitted around the cylindrical obstacle and is coaxial thereto. The ground plane is positioned between the plurality of antennas and the exterior surface of the cylindrical obstacle, and is configured to isolate the antennas from the obstacle. The ground plane may be composed of any suitable conductive material, such as a metal foil, a metal mesh, or the like. In an example, the cylindrical ground plane can be camouflaged, such that the cylindrical ground plane visually blends with the obstacle. For example, if the obstacle is a white light post, the cylindrical ground plane can be painted white to visually blend with the post.

The system also includes a processing circuit that is in communication with the receiver(s). The processing circuit receives measurements output by the receiver(s) (wherein such measurements are correlated in time), and computes an angle of arrival of a radio signal based upon the measurements output by the receiver(s). In an exemplary embodiment, the processing circuit can compute the angle of arrival of the radio signal based upon a mathematical model that defines electromagnetic relationships between an infinite length magnetic line source (antenna) and an infinite length perfectly conducting cylinder when the magnetic line source is placed on the cylinder. While neither the obstacle nor the antennas are infinite in length, empirically it has been found that such mathematical model is well-suited for use in connection with estimating the angle of arrival. The processing circuit can compute data pertaining to relative phase angles pertaining to each measurement based upon the mathematical model, and subsequently can execute a beamforming algorithm to compute the angle of arrival of the radio signal.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to computing an angle of arrival of radio signals are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference. Further, the terms "about" and "approximately" are intended to encompass values within 10% of a stated value, wherein the stated value is characterized by the terms "about" and "approximately".

Figure 1:
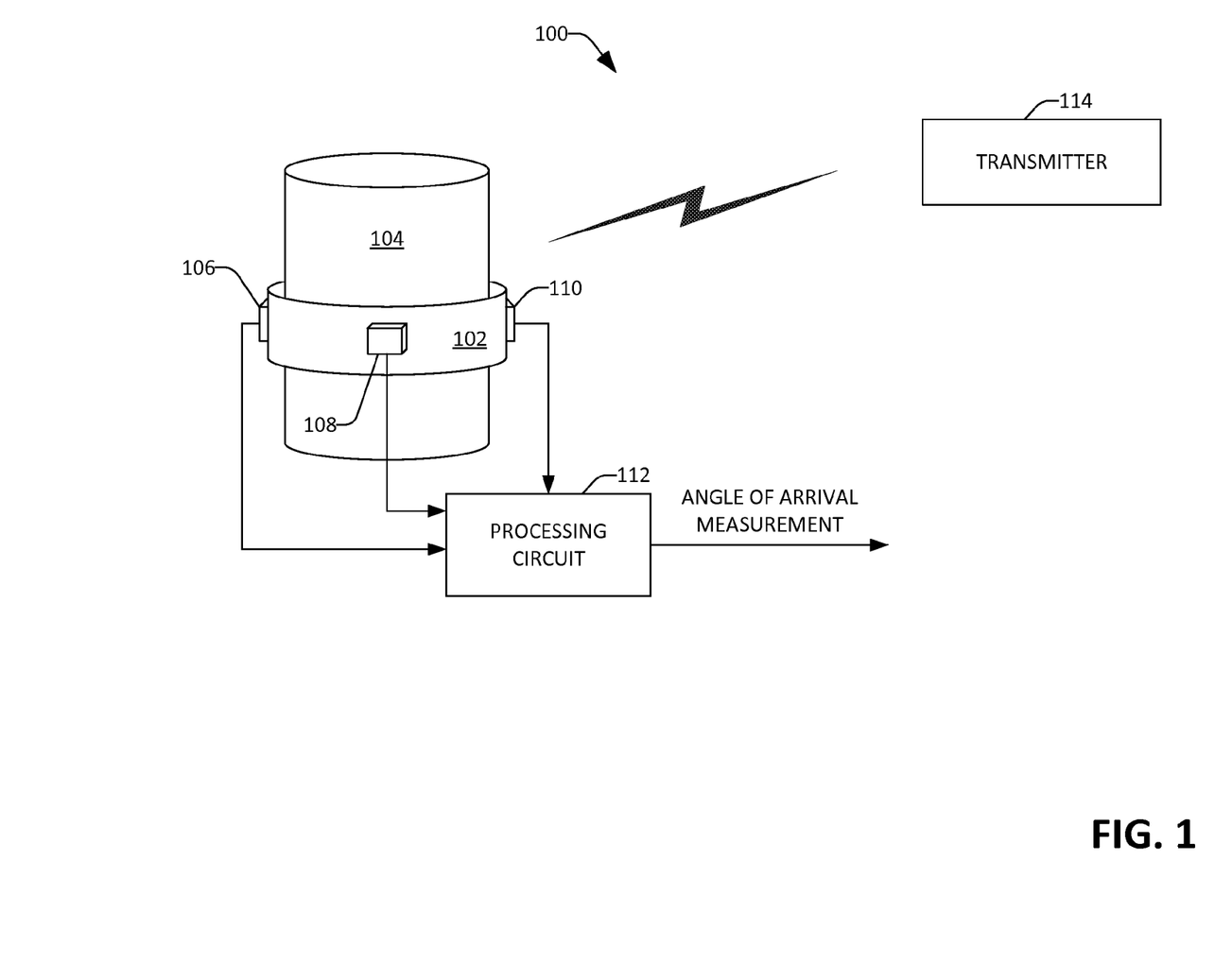
FIG. 1 is a functional block diagram of an exemplary system that is configured to compute angle of arrival of a radio signal.

With reference now to FIG. 1, an exemplary system 100 that facilitates determining an angle of arrival of a radio signal is illustrated, wherein the angle of arrival is relative to the system 100. In a non-limiting example, the angle of arrival can be in the terrestrial plane. In another example, the system 100 can be coupled to a projectile body (e.g., a missile or an aircraft), in which case the angle of arrival can be determined in a plane normal to an axis of a cylindrical or pseudo-cylindrical body (as described below). The system 100 optionally includes a cylindrical sheath 102 that is fitted around an exterior surface of a cylindrical obstacle 104, such that the cylindrical sheath 102 and the cylindrical obstacle 104 are coaxial. Thus, the cylindrical sheath 102 has an exterior surface and an interior surface, where the interior surface of the cylindrical sheath 102 contacts the exterior surface of the cylindrical obstacle 104. The cylindrical obstacle 104 may be a structure that is commonly found in various environments, such as a tree trunk, a tree branch, a telephone pole, a light post, a pipe, etc. Further, the cylindrical obstacle 104 may be a right cylinder or an elliptic cylinder.

The cylindrical sheath 102 can be formed of a suitable conductive material. Exemplary materials include metal foils, metal meshes, conductive fabrics, etc. In an example, the cylindrical sheath 102 can be malleable, such that the shape of the cylindrical sheath 102 can conform to the shape of the cylindrical obstacle 104. When the cylindrical obstacle 104 itself is formed of a conductive material (e.g., such as a metal light post), inclusion of the cylindrical sheath 102 in the system is optional.

The system 100 may further include a plurality of sensing elements that are positioned on the exterior surface of the cylindrical sheath 102 (or on the exterior surface of the cylindrical obstacle 104, when the cylindrical sheath 102 is not included in the system 100) about the axis of the cylindrical obstacle 104. As can be ascertained, the plurality of sensor elements 106-110 may be coplanar on a circular or elliptic cross-section of the cylindrical obstacle 104, although such arrangement is optional (e.g., the plurality of sensor elements 106-110 can be somewhat misaligned). Furthermore, in an example, the plurality of sensor elements 106-110 may be uniformly distributed about the exterior surface of the cylindrical sheath 102, symmetric about an axis of the cylindrical obstacle 104. Further, while the plurality of sensor elements 106-110 are shown as including three sensor elements, it is to be understood that the plurality of sensor elements 106-110 may include as few as two sensor elements. While there is theoretically no upper bound on a number of sensor elements that can be included in the system 100, in an exemplary embodiment, the system 100 can include 2-12 sensor elements distributed about the exterior surface of the cylindrical obstacle 104.

Each of the sensor elements 106-110 comprises an antenna. Optionally, each of the sensor elements 106-110 can include a receiver. Accordingly, the first sensor element 106 can include a first antenna and a first receiver coupled thereto, the second sensor element 108 can include a second antenna and a second receiver coupled thereto, and the third sensor element 110 can include a third antenna and a third receiver coupled thereto. In another example, multiple antennas in the system 100 can be coupled to a receiver, where the receiver includes a signal switching network that commutates among the antennas coupled thereto. In such an embodiment, antennas can be coupled to a receiver in a regular sequence, and the receiver can perform a separate measurement during each commutation period.

The antennas of the sensor elements are coupled to the cylindrical sheath 102, such that the cylindrical sheath 102 acts as a ground plane. The respective receivers of the sensor elements 106-110 are configured to receive voltages at the terminals of the antennas, and are further configured to output measurements pertaining to a radio signal detected by the antennas.

The system 100 also includes a processing circuit 112 that is in communication with the sensor elements 106-110. The processing circuit can be or include a general purpose CPU, a field programmable gate array (FPGA), an application specific integrated circuit (ASIC), or other suitable circuit that can perform computations over measurements. Further, in an example, the processing circuit 112 can be co-located with the cylindrical sheath 102 and the plurality of sensor elements 106-110. In another example, the processing circuit 112 may be remotely located from the sensor elements 106-110, such that measurements generated by the receivers of the sensor elements 106-110 are transmitted (e.g., by way of a wireless communications channel) to the processing circuit 112.

The processing circuit 112 is configured to compute an angle of arrival of a radio signal (with respect to the cylindrical obstacle 104) based upon measurements received from the sensor elements 106-110. In an example, the processing circuit 112 can utilize a mathematical model that models physics of the antennas situated about the cylindrical obstacle 104 in connection with computing the angle of arrival of the radio signal. For instance, the mathematical model can model the antennas as infinite-length magnetic line sources, and can model the sheath 102 as an infinite length, perfectly conducting cylinder. While it can be ascertained that the cylindrical object 104 and the sheath 102 are not infinite in length (wherein length is measured along the axis of the sheath 102 and the obstacle 104), and the antennas of the sensor elements 106-110 are also not of infinite length, empirically it has been found that use of such a mathematical model when computing the angle of arrival results in relatively accurate estimation of angle of arrival (e.g., with a per-measurement error being +/−8 degrees). Based upon such mathematical model, the processing circuit 112 can compute values pertaining to angle of arrival for each sensor element. The processing circuit 112 can subsequently execute a beamforming algorithm over such values to compute the angle of arrival of a radio signal. In an example, the beamforming algorithm may be a delay and sum beamforming algorithm (as described in greater detail below); it is to be understood, however, that other beamforming algorithms are contemplated.

Additional detail pertaining to elements of the system 100 will now be set forth. The system 100 can have a relatively low visual profile, such that the system 100 is not aesthetically displeasing. Further, the low visual profile allows for the system 100 to be well-suited for covert applications. For example, when the system 100 includes the cylindrical sheath 102, the cylindrical sheath 102 can be camouflaged, such that the cylindrical sheath 102 visually blends with the exterior surface of the cylindrical obstacle 104. Accordingly, for instance, when the obstacle 104 is a tree trunk or tree branch, the cylindrical sheath 102 can be painted to match the look of the bark of the tree. In another example, when the obstacle 104 is a plastic white pipe, the cylindrical sheath 102 can be painted white to match the exterior surface of the pipe.

Further, the antennas of the sensor elements 106-110 may have a relatively small lateral profile, due at least partially to the antennas optionally having a folded cavity structure, which will be described greater detail below. This structure reduces the length of the antennas about the axis of the cylindrical obstacle. Additionally, the structure results in reduction of an unwanted radiation mode, which extends orthogonal to the exterior surface of the cylindrical object 104 when the antenna is positioned on the cylindrical sheath 102. Specifically, suppression of the unwanted radiation mode has been found to improve the agreement between an analytical model of the signal phases and measurement thereof—however, suppression of such radiation mode is optional, and antenna structures that do not suppress such radiation mode can be included in the system 100. Further, to reduce visual profile (and/or aerodynamic drag when the system is coupled to a projectile or other flying body), the cylindrical object 104 can have a plurality of recesses, and the sensor elements 106-110 can be placed in such recesses. For example, bark or wood of a tree can be recessed to include the sensor elements 106-110. In another example, a missile or projectile body can be designed such that the sensor elements 106-110 can be inset therein.

Sizes of the sheath 102, obstacle 104, and antennas in the sensing elements 106-110 can be a function of a wavelength of radio signal that is to be subjected to analysis. In an example, the height of the cylindrical sheath 102 along the axis of the obstacle 104 can be between about ⅓ of the wavelength of interest and about ½ of the wavelength of interest. Thus, in an example, if it is desired to determine the angle of arrival of a radio signal that includes radio waves of 1 meter in length, then the height of the sheath 102 along the axis of the obstacle 104 can be between about 33 cm and about 50 cm.

Further, the obstacle 104 can be selected as a function of the wavelength of interest. Generally, it is desired for the circumference of the obstacle 104 to be approximately equivalent to the wavelength of interest. Accordingly, the obstacle 104 can be selected such that the circumference of the obstacle 104 is between about ⅓ of the wavelength of interest and 3x the wavelength of interest. Likewise, as the wavelength increases, the lateral length of the antennas in the sensor elements 106-110 and the amount of protrusion (of the antennas) from the exterior surface of the cylindrical sheath 102 will increase. For example, the lateral length of the antennas can be between approximately 2% of the wavelength and approximately 50% of the wavelength. The antenna may protrude from the obstacle 104 by a very small amount (e.g., the antenna may have a relatively small width), such as on the order of between about 1% of the wavelength and about 10% of the wavelength.

The processing circuit 112 can utilize the following algorithm when computing the angle of arrival of a radio signal based upon measurements output by the sensor elements 106-110, respectively:

$$H = \sum_{n=-\infty}^{\infty} \frac{j^n e^{jn(\theta-\theta')}}{H_n^2(\beta a)}, \quad (1)$$

where H represents the relative phase angle of the radiated far-field of an infinite-length magnetic line source on the surface of an infinite-length perfectly conducting cylinder, θ is the observation angle (relative to a reference angle), θ' is the angle of the magnetic line source relative to the reference angle, β is the wavenumber $$\left(\frac{2\pi}{\lambda}\right)$$

(where λ is the (wavelength of interest), and a is the radius of the cylinder. With more particularity regarding H, H is a complex number (having a magnitude and phase). To model the phase angle of the incident signal, only the phase angle φ of H need be evaluated. Thus, φ is the argument of the infinite sum on the right-hand side of Eq. (1). $H_n^2(\ )$ is known to be a Hankel function of the second kind. Again, it can be ascertained that neither the obstacle 104 nor the antennas of the sensor elements 106-110 are infinite in length. Empirically, however, the algorithm was found to be usable to obtain angle of arrival to an accuracy within about 8° per measurement. The processing circuit 112 can execute a delay and sum beamforming algorithm using the relative phase angles to compute the angles of arrival of radio signals.

With more detail pertaining to execution of the delay and sum beamforming algorithm, operation of the processing circuit 112 can be as follows. The processing circuit 112 can construct a "look vector" that comprises signal phase angles that one would expect to measure on each antenna in the system 100 (e.g., based on either 1: an analytical model, such as Eq. (1); or 2: pre-measured and/or characterization data of the antenna array in the same configuration on the obstacle) for all possible incident angles. In practice, the continuum of angles from 0-360 degrees can be discretized for computation (e.g., the processing circuit 112 can compute 360 look vectors, from 0 to 360 degrees in 1 degree steps). The processing circuit 112 can then measure the signal phase on each antenna. Thereafter, the processing circuit 112 can compute a dot (inner) product of each angle's look vector with the complex conjugate of the measured phase data, resulting in a single real number for each incident angle. The processing circuit 112 can then select the angle with the largest magnitude dot product result as being the incident angle.

When the cylindrical obstacle 104 is large enough with respect to the wavelength, some ambiguity may result (e.g., due to the antenna array phenomenon known as "grating lobes"). Specifically, the processing circuit 112 may identify two or more angles that have large dot product result magnitudes, where only one of such angles is the correct angle. The dot product result magnitudes may be similar due to noise—to resolve ambiguities, the processing circuit 112 can examine the signal strength captured by the antennas of the system. Elements facing towards the signal source typically observe a higher amplitude signal—accordingly, the processing circuit 112 can use a combination of dot product result and signal strength to determine the angle of arrival of the signal (e.g., signal strength alone may be insufficient to determine the angle of arrival at a relatively high resolution).

Operation of the system 100 is now described. A transmitter 114 transmits a radio signal, wherein radio waves of the radio signal have a wavelength of interest (e.g., the system 100 has been configured to analyze signals having radio waves of the wavelength emitted by the transmitter 114). Each of the sensor elements 106-110 outputs a measurement pertaining to the radio signal emitted by the transmitter 114. The cylindrical sheath 102 electromagnetically isolates the antenna from the properties of the obstacle 104—thus, the properties of the obstacle 104 need not be considered when computing the angle of arrival of the radio signal. The processing circuit 112 receives the measurements output by the sensor elements 106-110, and uses Eq. (1) to compute the relative phase angles, and thereafter computes the angle of arrival of the radio signal based upon the relative phase angles.

Figure 2:
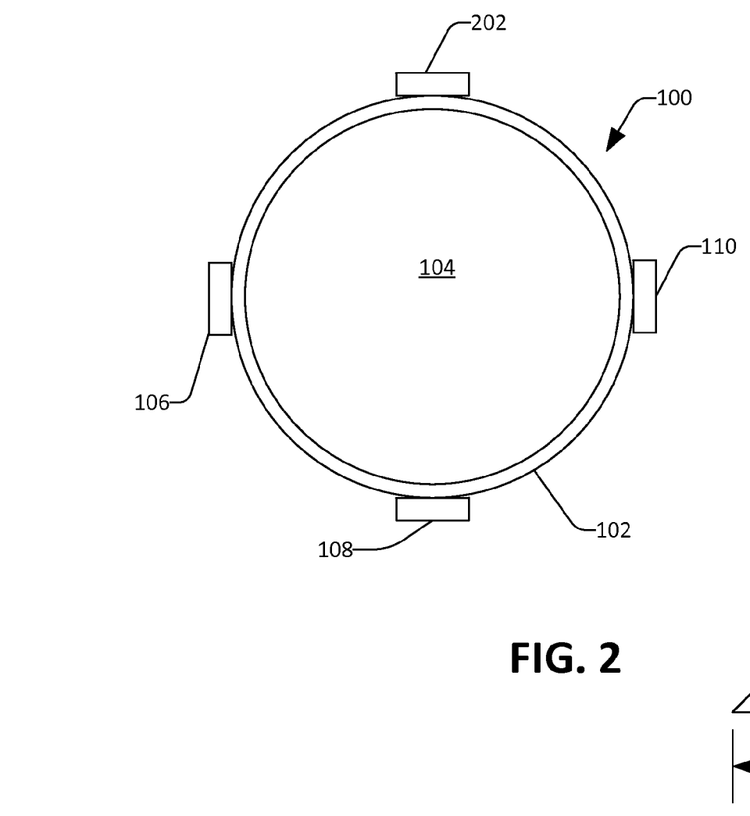
FIG. 2 is a cross-sectional view of a sensor array positioned about an exterior surface of a cylindrical obstacle.

Turning now to FIG. 2, a cross-sectional view of at least a portion of the exemplary system 100 is illustrated. As can be ascertained, the cylindrical sheath 102 is wrapped around the obstacle 104, such that the sheath 102 is adjacent to and contacting the obstacle 104. The sheath 102 is desirably made out of a relatively thin material to facilitate visually blending of the system 100 with the obstacle 104. The system 100 includes the plurality of sensor elements 106-110, as well as another sensor element 202. Accordingly, in this example, the system 100 includes four sensor elements. As can be ascertained, the sensor elements 106-110 and 202 are symmetrically arranged about the axis of the cylindrical sheath 102 (and the axis of the cylindrical obstacle 104), and are further uniformly distributed about the exterior surface of the cylindrical sheath 102. That is, the sensor elements 106-110 and 202 are offset with respect to one another by 90 degrees. This symmetric and uniform distribution about the exterior surface of the sheath 102, however, is optional. As can be ascertained from review of Eq. (1), the angle of each antenna (relative to a reference angle) can be inserted into the algorithm. Furthermore, while the system 100 is shown here as including four sensor elements, it is to be understood that the system 100 may include fewer (as few as two) or more sensor elements.

Figure 3:
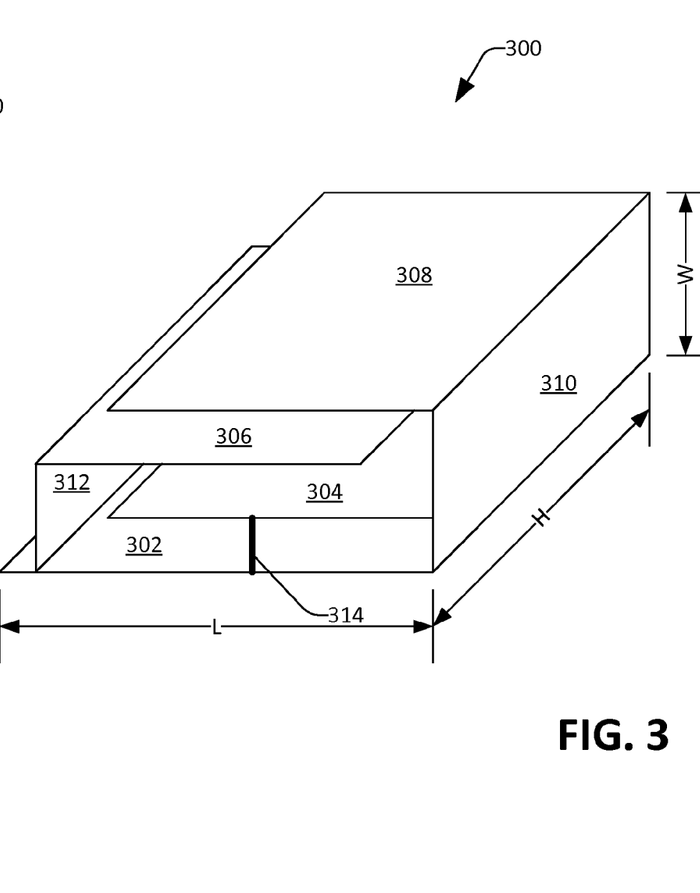
FIG. 3 is an isometric view of an exemplary antenna that can be included in the antenna array of FIG. 2.

Now referring to FIG. 3, an exemplary antenna 300 that can be included in a sensor element of the system 100 is shown. The antenna 300 shown in FIG. 3 can be referred to as having a folded cavity structure. The antenna 300 includes four parallel sections 302, 304, 306, and 308. The antenna 300 also includes two sections 310 and 312 that are orthogonal to the four sections 302-308. Each of the sections 304, 306, and 308 intersect one of the sections 310 and 312, and the section 302 intersects both sections 310 and 312. The sections 302-308 and 310-312 can be formed of a conductive material, where high conductivity materials may be preferable. Size of gaps between the sections 302 and 304, 304 and 306, and 306 and 308 may be approximately equivalent. The antenna 300 includes a feed line that extends between sections 302 and 304. The antenna 300 has a lateral length "L", a height "H", and a width "W". When placed on the cylindrical sheath 102, the antenna 300 is positioned such that the lateral length of the antenna extends around the exterior surface of the sheath 102 orthogonal to the axis of the sheath 102 (and the obstacle 104). In other words, the antenna 300 is oriented with respect to the cylindrical obstacle 104 such that the height (dimension "H") is along the axis of the cylindrical obstacle 104.

The shape of the antenna 300 is advantageous for several reasons. First, the folded cavity structure reduces the lateral length "L" of the antenna compared to unfolded structures, thereby allowing for the antenna 300 to have a smaller visible footprint when placed on the sheath 102 and/or the obstacle 104. Further, the structure of the antenna 300 causes an undesired radiation mode to be suppressed. Specifically, the sections 310 and 312 support vertical (along the "W" direction) currents that are substantially equal in magnitude and opposite in direction, thus their radiation is suppressed. Without such cavity structure (e.g., in a standard, non-folded PIFA-type antenna), there is a single "vertical" section, and thus no equal and opposite vertical current can exist. Suppression of such radiation mode allows for better agreement between the analytical model of Eq. (1) and measured data.

It is to be understood that other types of antennas can also be employed. For example, the plurality of antennas 106-110 and 202 can include a patch antenna, a planar inverted F antenna (PIFA), or a modified slot antenna. With reference to the modified slot antenna, such antenna can be modified to include a cavity structure. The orientation of these antennas relative to the cylindrical obstacle 104 would map to the orientation of the antenna relative to the cylindrical obstacle 104 described above.

Figure 4:
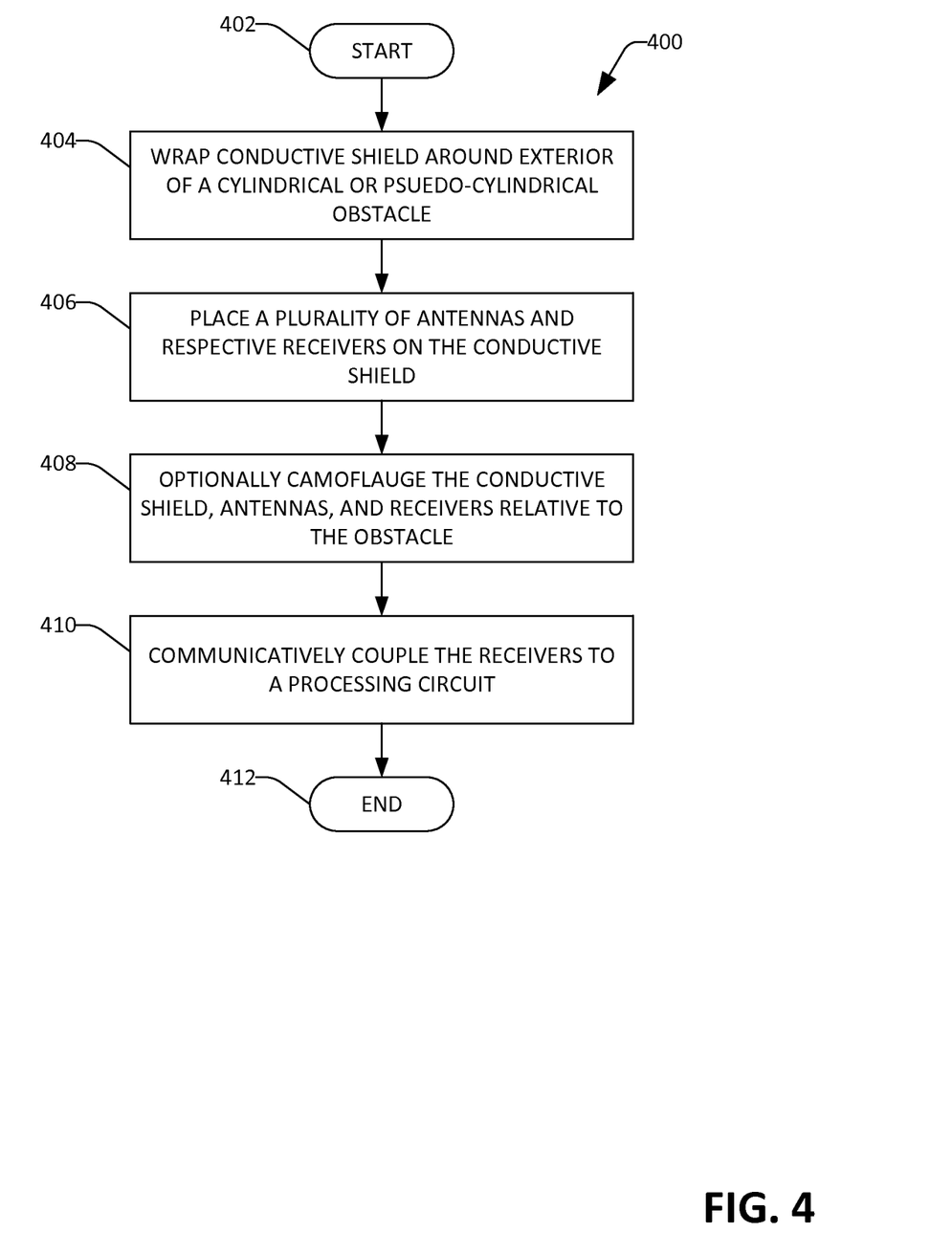
FIG. 4 is a flow diagram illustrating an exemplary methodology for forming a system that is configured to compute angle of arrival of radio signals.
Figure 5:
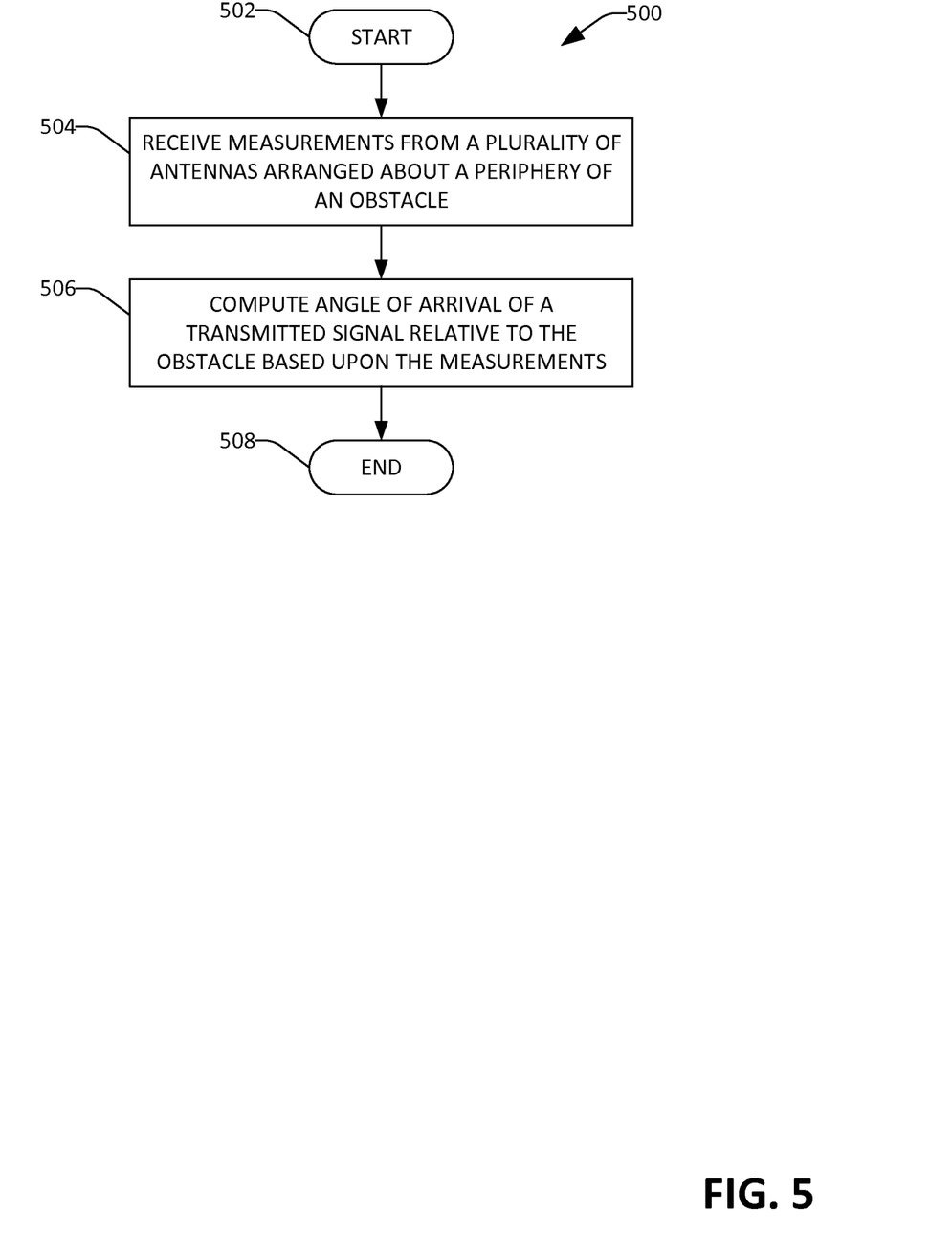
FIG. 5 is a flow diagram illustrating an exemplary methodology for computing angle of arrival of a transmitted radio signal.

FIGS. 4-5 illustrate exemplary methodologies relating to computing an angle of arrival of radio waves. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, at least some of the acts described with reference to FIG. 5 may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 4, an exemplary methodology 400 for configuring a system for computing angle of arrival of a radio signal is illustrated. The methodology 400 starts at 402, and at 404, a conductive shield is wrapped around an exterior surface of a cylindrical or pseudo-cylindrical obstacle. The conductive shield may act as a ground plane and may be formed of any suitable conductive material.

At 406, a plurality of antennas and respective receivers are placed on the conductive shield around the obstacle. In an example, the plurality of antennas may be placed around the conductive shield symmetrically about an axis of the conductive shield. Further, as noted with respect to FIG. 3, the antennas may have a folded cavity structure.

At 408, the conductive shield, antennas, and receivers are optionally camouflaged relative to the obstacle. For example, the conductive shield, the antennas, and/or the receivers can be painted (or otherwise colored) to visually blend with the obstacle.

At 410, the receivers are communicatively coupled with a processing circuit that is programmed with an algorithm that is configured to compute the angle of arrival of a radio signal based upon measurements output by the receivers. The methodology 400 completes at 412.

Turning to FIG. 5, an exemplary methodology 500 that facilitates computing angle of arrival of a radio signal is illustrated. The methodology 500 starts at 502, and at 504, measurements are received from a plurality of antennas arranged about the periphery of a cylindrical obstacle. At 506, direction of arrival of a transmitted signal is computed relative to the obstacle based upon the measurements received at 504. For example, Eq. (1) in connection with computing the angle of arrival of the transmitted signal. The methodology 500 completes at 508.

Figure 6:
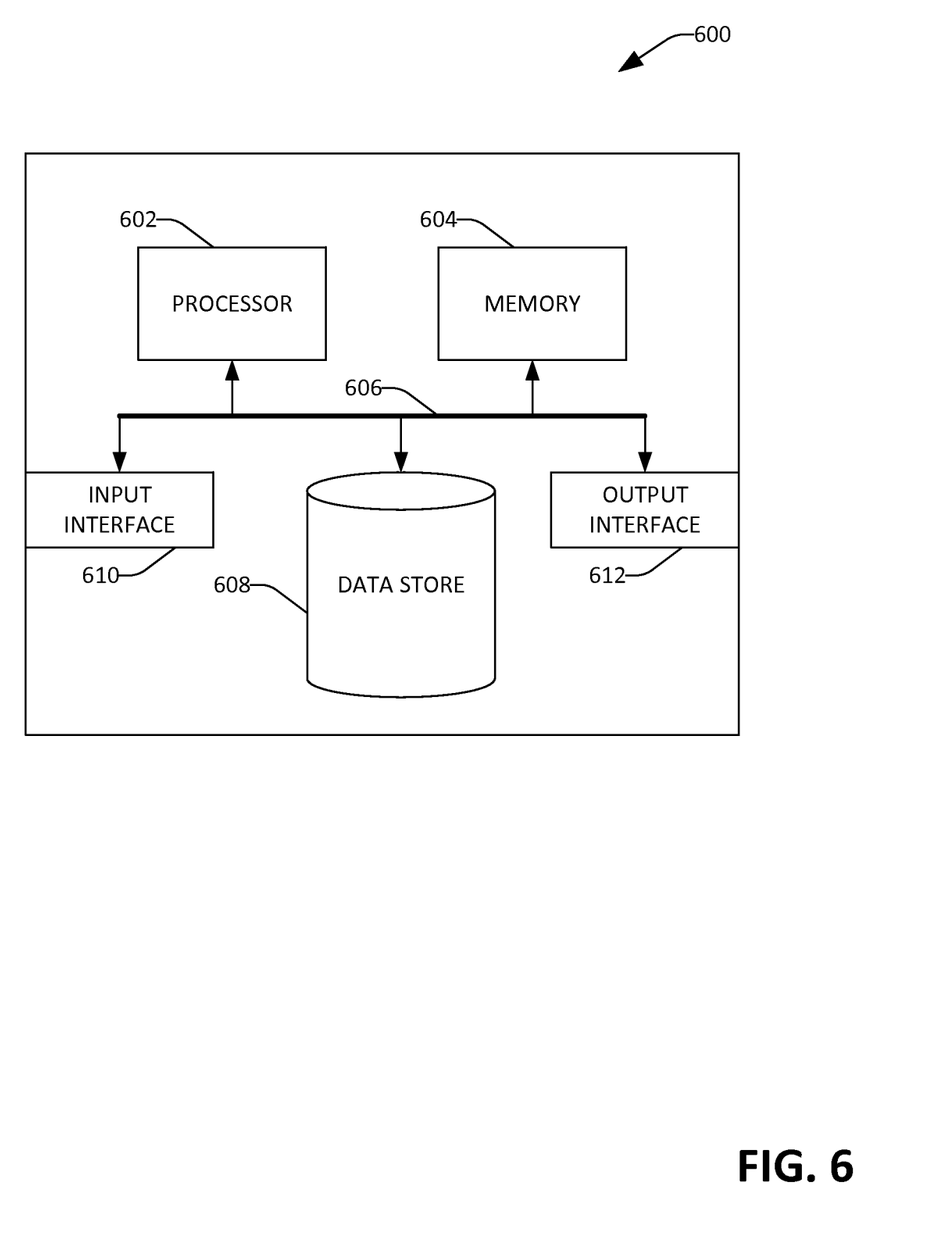
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that computes an angle of arrival of a transmitted radio signal. The computing device 600 includes at least one processor 602 that executes instructions that are stored in a memory 604. The instructions may be, for instance, instructions for implementing functionality described as being carried out by the processing circuit 112. The processor 602 may access the memory 604 by way of a system bus 606. In addition to storing executable instructions, the memory 604 may also store measurements output by receives.

The computing device 600 additionally includes a data store 608 that is accessible by the processor 602 by way of the system bus 606. The data store 608 may include executable instructions, measurements, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system that facilitates computing an angle of arrival of a radio signal emitted from a transmitter, the system comprising:
    a cylindrical sheath that is fitted around an exterior surface of a cylindrical obstacle, the sheath having an interior surface and an exterior surface;
    a plurality of antennas positioned on the exterior surface of the cylindrical sheath;
    a plurality of receivers respectively coupled to the plurality of antennas, the plurality of receivers configured to output respective measurements pertaining to the radio signal; and
    a processing circuit that is in communication with each receiver in the plurality of receivers, the processing circuit configured to compute the angle of arrival of the radio signal based upon:
        a model that models the plurality of antennas as infinite-length magnetic line sources and models the cylindrical sheath as an infinite length conductive cylinder; and
        the measurements pertaining to the radio signal respectively output by the plurality of receivers.

2. The system of claim 1, the cylindrical sheath formed of a conductive material.

3. The system of claim 2, the conductive material being one of a metal mesh, a metal foil, or a conductive plastic.

4. The system of claim 1, wherein the cylindrical sheath is camouflaged to visually blend with the cylindrical obstacle.

5. The system of claim 1, wherein the obstacle is one of a tree branch, a tree trunk, or a pipe.

6. The system of claim 1, wherein at least one antenna in the plurality of antennas has a folded cavity structure.

7. The system of claim 1, wherein the radio signal includes radio waves that have a wavelength, and further wherein each antenna in the plurality of antennas has a width between about 1% of the wavelength and about 10% of the wavelength.

8. The system of claim 1, wherein the plurality of antennas are uniformly distributed around the exterior surface of the cylindrical sheath.

9. The system of claim 1, wherein the radio signal includes radio waves that have a wavelength, and further wherein a height of the cylindrical sheath along an axis of the cylindrical sheath is between about ⅓ of the wavelength and about ½ of the wavelength.

10. The system of claim 1, the processing circuit configured to execute a delay and sum beamforming algorithm to compute the angle of arrival of the radio signal.

11. The system of claim 1, wherein at least one antenna in the plurality of antennas is one of a patch antenna, a planar inverted F antenna, or a modified slot antenna.

12. The system of claim 1, wherein the radio signal comprises radio waves that have a wavelength, and wherein a circumference of the cylindrical sheath is between about ⅓ of the wavelength and about 3× the wavelength.

13. The system of claim 1, wherein the processing circuit is configured to compute the angle of arrival of the radio signal through use of the following algorithm:

$$H = \sum_{n=-\infty}^{\infty} \frac{j^n e^{jn(\theta-\theta')}}{H_n^2(\beta a)},$$

where H represents a relative phase angle of a radiated far-field of an infinite-length magnetic line source in the line sources on a surface of the infinite-length conducting cylinder, $\theta$ is an observation angle, $\theta'$ is an angle of the magnetic line source relative to a reference angle, $\beta$ is a wavenumber $$\left(\frac{2\pi}{\lambda}\right)$$

where $\lambda$ is a wavelength, and a is a radius of the cylinder.

14. A method for computing angle of arrival of a radio signal emitted by a transmitter, the method comprising:

receiving, from a plurality of receivers, respective measurements pertaining to the radio signal, the plurality of receivers coupled to a respective plurality of antennas, the plurality of antennas arranged about a cylindrical obstacle; and computing the angle of arrival of the radio signal based upon:
  a model that models the plurality of receivers as infinite-length magnetic line sources and that models the cylindrical obstacle as an infinite-length conductive cylinder; and
  the measurements received from the plurality of receivers.

15. The method of claim 14, wherein the plurality of antennas are positioned about a cylindrical ground plane that is wrapped around the cylindrical obstacle.

16. The method of claim 14, wherein computing the angle arrival of the radio signal comprises executing a delay and sum beamforming algorithm over the measurements received from the plurality of receivers.

17. The method of claim 14, wherein at least one antenna in the plurality of antennas has a folded cavity structure.

18. The method of claim 14, the obstacle being an elliptical cylinder.

19. A system that is configured to compute direction of arrival of a radio signal, the system comprises:
  a plurality of measurement emitter means for emitting measurements about the radio signal, the plurality of measurement emitter means positioned about an exterior surface of a cylindrical obstacle, each measurement emitter means comprises an antenna means and a receiver means; and
  processor means for computing the direction of arrival of the radio signal based upon:
    a model that models each antenna means as an infinite-length magnetic line source and models the cylindrical obstacle as an infinite-length conductive cylinder; and
    the measurements emitted by the plurality of receiver means.

20. The system of claim 19, further comprising a ground plane that is wrapped around the exterior surface of the cylindrical obstacle, the antenna means in each of the measurement emitter means coupled to the ground plane.

* * * * *